(12) United States Patent
Suzuki (10) Patent No.: US 12,152,676 B2
(45) Date of Patent: Nov. 26, 2024

(54) SLIDING COMPONENT

(71) Applicant: EAGLE INDUSTRY CO., LTD., Tokyo (JP)

(72) Inventor: Hiroshi Suzuki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/013,513

(22) PCT Filed: Jul. 1, 2021

(86) PCT No.: PCT/JP2021/024943
§ 371 (c)(1),
(2) Date: Dec. 28, 2022

(87) PCT Pub. No.: WO2022/009769
PCT Pub. Date: Jan. 13, 2022

(65) Prior Publication Data
US 2023/0296176 A1 Sep. 21, 2023

(30) Foreign Application Priority Data
Jul. 6, 2020 (JP) .................................. 2020-116358

(51) Int. Cl.
*F16J 15/34* (2006.01)
(52) U.S. Cl.
CPC ................. *F16J 15/3416* (2013.01)
(58) Field of Classification Search
CPC .. F16J 15/3416; F16C 33/1065; F16C 17/045
See application file for complete search history.

(56) References Cited

U.S. PATENT DOCUMENTS 1,876,515 A * 9/1932 Emmet ................ F16J 15/3416
277/408
2,244,450 A * 6/1941 Erni ..................... F16J 15/3416
415/113

(Continued)

FOREIGN PATENT DOCUMENTS

CN 1245552 2/2000 ............... F16J 15/34
CN 2460801 11/2001 ............... F16J 15/40

(Continued)

OTHER PUBLICATIONS

International Search Report and Written Opinion issued in PCT/JP2021/024940, dated Aug. 10, 2021, with English translation, 13 pages.

(Continued)

*Primary Examiner* — Eugene G Byrd
(74) *Attorney, Agent, or Firm* — HAYES SOLOWAY P.C.

(57) ABSTRACT

An annular sliding component has a sliding surface relatively sliding with eccentric rotation. The sliding surface is provided with a dynamic pressure generation groove having an annular shape along a circumferential direction of the sliding surface and a plurality of conduction grooves configured to provide communications between the dynamic pressure generation groove and one of two external spaces of the sliding surface, the external spaces being on an outer diameter side and an inner diameter side of the sliding surface, respectively. An imaginary line passing through one of the conduction grooves and a center point of the sliding surface does not intersect any one of remains of the conduction grooves.

20 Claims, 7 Drawing Sheets

(56) References Cited

U.S. PATENT DOCUMENTS

| | | | | |
|---|---|---|---|---|
| 3,380,040 | A | 4/1968 | Liggett | F16C 17/045 |
| 3,383,116 | A | 5/1968 | Carter | 277/96 |
| 3,527,465 | A | 9/1970 | Guinard | |
| 3,675,935 | A | 7/1972 | Ludwig | F16J 15/342 |
| 3,695,789 | A | 10/1972 | Jansson | F01C 21/003 |
| 3,704,019 | A | 11/1972 | McHugh | 277/400 |
| 3,782,737 | A | 1/1974 | Ludwig et al. | 277/27 |
| 4,056,478 | A | 11/1977 | Capelli | C01M 5/00 |
| 4,071,253 | A | 1/1978 | Heinen et al. | 277/3 |
| 4,523,764 | A | 6/1985 | Albers et al. | 277/3 |
| 4,889,348 | A | 12/1989 | Amundson | 277/306 |
| 5,071,141 | A | 12/1991 | Lai et al. | |
| 5,092,612 | A | 3/1992 | Victor et al. | 277/96.1 |
| 5,174,584 | A | 12/1992 | Labrman | 277/400 |
| 5,180,173 | A | 1/1993 | Kimura et al. | |
| 5,224,714 | A | 7/1993 | Kimura | 277/400 |
| 5,316,455 | A | 5/1994 | Yoshimura | F04C 29/0021 |
| 5,447,316 | A | 9/1995 | Matsui | 277/400 |
| 5,556,111 | A * | 9/1996 | Sedy | F16J 15/3412 |
| | | | | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,666 | B2 | 2/2017 | Ferris | F16J 15/3412 |
| 9,574,667 | B2 | 2/2017 | Takahashi et al. | F16J 15/342 |
| 9,587,745 | B2 * | 3/2017 | Itadani | F16J 15/348 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/3412 |
| 10,865,883 | B2 | 12/2020 | Seki et al. | F16J 15/3404 |
| 11,053,975 | B2 * | 7/2021 | Imura | F16C 17/045 |
| 11,248,706 | B2 | 2/2022 | Imura | F16C 33/74 |
| 11,320,052 | B2 | 5/2022 | Imura et al. | F16J 15/34 |
| 11,913,454 | B2 | 2/2024 | Suzuki | F04C 29/00 |
| 2002/0014743 | A1 | 2/2002 | Zheng | 277/358 |
| 2002/0093141 | A1 | 7/2002 | Wang | F16J 15/34 |
| 2002/0158416 | A1 | 10/2002 | Hosanna | F16J 15/3404 |
| 2004/0080112 | A1 | 4/2004 | Tejima | F16J 15/3436 |
| 2005/0135957 | A1 | 6/2005 | Park | F04C 18/0215 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 27/352 |
| 2008/0050260 | A1 | 2/2008 | Iwanami et al. | 418/55.6 |
| 2008/0100001 | A1 | 5/2008 | Flaherty | |
| 2009/0200749 | A1 | 8/2009 | Teshima | F16J 15/3484 |
| 2011/0194966 | A1 | 8/2011 | Takeuchi | F04B 18/0215 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 | 1/2012 | Watanabe | F16J 15/34 |
| 2012/0217705 | A1 | 8/2012 | Hosoe | 277/400 |
| 2013/0168928 | A1 | 7/2013 | Schrufer | C10M 103/02 |
| 2013/0209011 | A1 | 8/2013 | Tokunaga | |
| 2013/0323105 | A1 | 12/2013 | Chao et al. | F04C 29/028 |
| 2014/0159314 | A1 * | 6/2014 | Hosoe | F16J 15/3496 |
| | | | | 277/358 |
| 2014/0197600 | A1 | 7/2014 | Hosoe | F16J 15/342 |
| 2014/0217676 | A1 | 8/2014 | Hosoe et al. | 277/350 |
| 2014/0294330 | A1 | 10/2014 | Tokunaga | F16C 17/04 |
| 2014/0319776 | A1 | 10/2014 | Theike et al. | |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0184752 | A1 | 7/2015 | Itadani | F16J 15/3412 |
| 2015/0345642 | A1 | 12/2015 | Haas | F16J 15/3496 |
| 2015/0377297 | A1 | 12/2015 | Tokunaga et al. | F16C 33/748 |
| 2015/0377360 | A1 * | 12/2015 | Itadani | F16J 15/3448 |
| | | | | 277/400 |
| 2016/0033045 | A1 | 2/2016 | Itadani et al. | F16J 15/3412 |
| 2016/0097457 | A1 | 4/2016 | Sun et al. | F16J 15/3412 |
| 2017/0089467 | A1 | 3/2017 | Young | F01D 11/003 |
| 2017/0146014 | A1 | 5/2017 | Ohta et al. | F04C 29/0021 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0073394 | A1 | 3/2018 | Tokunaga et al. | F01D 25/18 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/3412 |
| 2018/0195618 | A1 | 7/2018 | Itadani et al. | F16J 15/3416 |
| 2018/0299015 | A1 | 10/2018 | Itadani | F16J 15/3448 |
| 2019/0169988 | A1 | 6/2019 | Tokunaga et al. | F01C 19/12 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2020/0141444 | A1 | 5/2020 | Thatte | F16C 17/08 |
| 2020/0224722 | A1 * | 7/2020 | Imura | F16C 33/743 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0116032 | A1 * | 4/2021 | Kimura | F16J 15/188 |
| 2021/0364034 | A1 | 11/2021 | Okada | F16J 15/342 |
| 2022/0056949 | A1 | 2/2022 | Ikeda et al. | F16C 17/04 |
| 2023/0027772 | A1 | 1/2023 | Suzuki et al. | F16C 17/02 |
| 2023/0258182 | A1 | 8/2023 | Suzuki | F04C 18/0215 |

FOREIGN PATENT DOCUMENTS

| | | | |
|---|---|---|---|
| CN | 1401924 | 3/2003 | F16J 15/16 |
| CN | 1529063 | 9/2004 | F16C 33/10 |
| CN | 1607710 | 4/2005 | F16C 17/08 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |

(56) References Cited

FOREIGN PATENT DOCUMENTS

| | | | | |
|---|---|---|---|---|
| CN | 104685273 | 6/2015 | ............. | F16J 15/34 |
| CN | 205244387 | 5/2016 | ............. | F16J 15/16 |
| CN | 106029294 | 10/2016 | ......... | B23K 26/364 |
| CN | 205877184 | 1/2017 | ............. | F16J 15/16 |
| CN | 205877198 | 1/2017 | ............. | F16J 15/34 |
| CN | 106439023 | 2/2017 | ............. | F16J 15/16 |
| CN | 107489770 | 12/2017 | ............. | F16J 15/34 |
| CN | 108131386 | 6/2018 | ............. | F16C 17/10 |
| CN | 109237042 | 1/2019 | ............. | F16J 15/34 |
| CN | 110770456 | 2/2020 | ............. | F16C 33/12 |
| CN | 110925426 | 3/2020 | ............. | F16J 15/16 |
| CN | 111656065 | 9/2020 | ............. | F16J 15/34 |
| DE | 3223703 | 6/1982 | ............. | F16J 15/34 |
| DE | 10048256 | 9/2000 | ............. | F16C 33/06 |
| DE | 102008038396 | 2/2010 | | |
| EP | 0369295 | 11/1988 | ............. | F16J 15/34 |
| EP | 0518681 | 2/1992 | ............. | G11B 15/60 |
| EP | 0589514 | 9/1992 | ............. | B21J 5/12 |
| EP | 0637706 | 8/1993 | ............. | F16J 15/34 |
| EP | 2138225 | 12/2009 | ............. | B01J 13/20 |
| EP | 2754931 | 7/2014 | ............. | F16J 15/34 |
| EP | 3112078 | 1/2017 | ......... | B23K 26/364 |
| EP | 3196516 | 7/2017 | ............. | F16J 15/34 |
| EP | 3217049 | 9/2017 | ............. | F16J 15/34 |
| EP | 3396186 | 10/2018 | ............. | F16C 33/10 |
| EP | 3575621 | 12/2019 | ............. | F16C 33/10 |
| EP | 3575643 | 12/2019 | ............. | F16J 15/34 |
| EP | 3650722 | 5/2020 | ............. | F16C 33/12 |
| FR | 2342440 | 9/1997 | ............. | F16J 15/34 |
| GB | 1509482 | 5/1978 | ............. | F16C 33/10 |
| GB | 2263952 | 8/1993 | ............. | F16J 15/34 |
| JP | S51-034974 | 3/1976 | | |
| JP | S52-143571 | 10/1977 | ............. | F16J 15/26 |
| JP | 57163770 | 10/1982 | ......... | F16J 15/3412 |
| JP | S59-195253 | 12/1984 | ............. | F16J 15/34 |
| JP | S59-195254 | 12/1984 | ............. | F16J 15/34 |
| JP | S61-8402 | 1/1986 | ............. | F01C 1/01 |
| JP | S63-134883 | 6/1988 | ............. | F04C 18/02 |
| JP | S63-190975 | 8/1988 | ............. | F16J 15/34 |
| JP | H02-16381 | 1/1990 | ............. | F04C 18/02 |
| JP | H02-236067 | 9/1990 | ............. | F16J 15/34 |
| JP | H02-136863 | 11/1990 | ............. | F16J 15/34 |
| JP | H04-50559 | 2/1992 | ............. | F16J 15/34 |
| JP | H04-337165 | 11/1992 | ............. | F16J 15/34 |
| JP | H04-362289 | 12/1992 | ............. | F04C 18/02 |
| JP | H05-60247 | 3/1993 | ............. | F16J 15/34 |
| JP | H05-296248 | 11/1993 | | |
| JP | H05-90049 | 12/1993 | ............. | F16J 15/34 |
| JP | H06-17941 | 1/1994 | ............. | F16J 15/34 |
| JP | H06-117547 | 4/1994 | ............. | F16J 15/34 |
| JP | H06-174107 | 6/1994 | ............. | F16J 15/34 |
| JP | H6200927 | 7/1994 | ............. | F16C 17/02 |
| JP | H06-323442 | 11/1994 | ............. | F16J 15/34 |
| JP | H06-105105 | 12/1994 | ............. | F16J 15/34 |
| JP | H07-43038 | 5/1995 | ............. | F16J 15/34 |
| JP | 9-89119 | 3/1997 | ............. | F16J 15/34 |
| JP | H09228968 | 9/1997 | ............. | F01C 17/06 |
| JP | 9-292034 | 11/1997 | ............. | F16J 15/34 |
| JP | H10-281299 | 10/1998 | ............. | F16J 15/34 |
| JP | H10-292867 | 11/1998 | | |
| JP | H10-339286 | 12/1998 | ............. | F04C 18/02 |
| JP | H11-132163 | 5/1999 | ............. | F04C 18/02 |
| JP | H11-287329 | 10/1999 | ............. | F16J 15/34 |
| JP | H11-303858 | 11/1999 | ............. | F16C 17/10 |
| JP | 3066367 | 5/2000 | ............. | F16J 15/34 |
| JP | 2001-12458 | 1/2001 | ............. | F16C 17/10 |
| JP | 2003-343730 | 12/2003 | ............. | F16J 15/22 |
| JP | 2004-360903 | 12/2004 | ............. | F16J 15/447 |
| JP | 2005-155894 | 6/2005 | ............. | F16C 17/04 |
| JP | 2005-180652 | 7/2005 | ............. | F16J 15/34 |
| JP | 2005-315391 | 11/2005 | | |
| JP | 2005-337503 | 12/2005 | ............. | F16J 15/34 |
| JP | 2006-9614 | 1/2006 | ............. | F04C 18/08 |
| JP | 2006-77899 | 3/2006 | ............. | F16J 15/34 |
| JP | 2006-90524 | 4/2006 | ............. | F16C 17/02 |
| JP | 2006-183702 | 7/2006 | ............. | F16C 17/04 |
| JP | 2006-316677 | 11/2006 | ............. | F04C 18/02 |
| JP | 2007-162045 | 6/2007 | | |
| JP | 2008-51018 | 3/2008 | ............. | F04C 18/02 |
| JP | 2008-51030 | 3/2008 | ............. | F04C 18/02 |
| JP | 2008-106940 | 5/2008 | ............. | F16J 15/34 |
| JP | 2011-74931 | 4/2011 | ............. | F16J 15/34 |
| JP | 2011-185292 | 9/2011 | ............. | F16J 15/34 |
| JP | 2012-2295 | 1/2012 | ............. | F16J 15/34 |
| JP | 2012-062534 | 3/2012 | | |
| JP | 2012-82794 | 4/2012 | ............. | F04C 18/02 |
| JP | 2012-12213 S | 6/2012 | ............. | C25D 15/02 |
| JP | 2013-167216 | 8/2013 | ............. | F04C 18/02 |
| JP | 2013-213545 | 10/2013 | ............. | F16C 32/06 |
| JP | 2014-529052 | 10/2014 | | |
| JP | 2015-063647 | 4/2015 | | |
| JP | 2015-68330 | 4/2015 | ............. | F04C 29/00 |
| JP | 5693599 | 4/2015 | | |
| JP | 2015-183631 | 10/2015 | ............. | F04C 2/10 |
| JP | 2016-61208 | 4/2016 | ............. | F04C 18/02 |
| JP | 2016-80090 | 5/2016 | ............. | F16J 15/34 |
| JP | 5960145 | 7/2016 | ............. | F16J 15/34 |
| WO | WO2006051702 | 5/2006 | ............. | F16J 15/34 |
| WO | WO2011115073 | 9/2011 | ............. | F16J 15/34 |
| WO | WO2012046749 | 4/2012 | ............. | F16J 15/34 |
| WO | WO2013035503 | 3/2013 | | |
| WO | WO2013053411 | 4/2013 | | |
| WO | WO2014061544 | 4/2014 | | |
| WO | WO2014148316 | 9/2014 | ............. | F16J 15/34 |
| WO | WO2014148317 | 9/2014 | ............. | F16J 15/34 |
| WO | WO2014174725 | 10/2014 | ............. | F16J 15/34 |
| WO | WO2015111707 | 7/2015 | ............. | F16J 15/18 |
| WO | WO2016035860 | 3/2016 | ............. | F16J 15/34 |
| WO | WO2016167262 | 10/2016 | ............. | F16J 15/34 |
| WO | WO2016186015 | 11/2016 | ............. | F16J 15/34 |
| WO | WO2016186019 | 11/2016 | ............. | F16J 15/34 |
| WO | WO2016186020 | 11/2016 | ............. | F16J 15/34 |
| WO | WO2016203878 | 12/2016 | ............. | F16J 15/34 |
| WO | WO2017002774 | 1/2017 | ............. | F16J 15/34 |
| WO | WO2017061406 | 4/2017 | ............. | F16J 15/34 |
| WO | WO2018025629 | 2/2018 | ............. | F02B 55/02 |
| WO | WO2018092742 | 5/2018 | ............. | F16J 15/34 |
| WO | WO2018105505 | 6/2018 | ............. | F16J 33/12 |
| WO | WO2018139231 | 8/2018 | ............. | F16J 15/34 |
| WO | WO2020129846 | 6/2020 | ............. | F16C 17/04 |
| WO | WO2021125201 | 6/2021 | ............. | F16J 15/18 |

OTHER PUBLICATIONS

International Preliminary Report on Patentability issued in PCT/JP2021/024940, dated Jan. 10, 2023, 4 pages.
International Search Report and Written Opinion issued in PCT/JP2021/024941, dated Sep. 14, 2021, with English translation, 13 pages.
International Preliminary Report on Patentability issued in PCT/JP2021/024941, dated Jan. 10, 2023, 5 pages.
International Search Report and Written Opinion issued in PCT/JP2021/024938, dated Aug. 3, 2021, with English translation, 12 pages.
International Preliminary Report on Patentability issued in PCT/JP2021/024938, dated Jan. 10, 2023, 4 pages.
International Search Report and Written Opinion issued in PCT/JP2021/024945, dated Sep. 7, 2021, with English translation, 16 pages.
International Preliminary Report on Patentability issued in PCT/JP2021/024945, dated Jan. 10, 2023, 6 pages.
International Search Report and Written Opinion issued in PCT/JP2021/024943, dated Sep. 7, 2021, with English translation, 13 pages.
International Preliminary Report on Patentability issued in PCT/JP2021/024943, dated Jan. 10, 2023, 5 pages.
International Search Report and Written Opinion issued in PCT/JP2021/024944, dated Jul. 27, 2021, with English translation, 11 pages.
International Preliminary Report on Patentability issued in PCT/JP2021/024944, dated Jan. 10, 2023, 4 pages.

(56) References Cited

OTHER PUBLICATIONS

Official Action issued in related U.S. Appl. No. 18/012,853, dated Sep. 8, 2023, 11 pages.
Official Action issued in related U.S. Appl. No. 18/012,857, dated Oct. 5, 2023, 11 pages.
Official Action issued in related U.S. Appl. No. 18/012,856, dated Sep. 11, 2023, 8 pages.
Chinese Official Action issued in related Chinese Patent Application Serial No. 202180044553.5, dated Apr. 28, 2024, 13 pages with translation.
U.S. Appl. No. 18/012,853, filed Dec. 23, 2022, Suzuki.
U.S. Appl. No. 18/012,856, filed Dec. 23, 2022, Suzuki.
U.S. Appl. No. 18/012,857, filed Dec. 23, 2022, Suzuki.
U.S. Appl. No. 18/013,515, filed Dec. 28, 2022, Suzuki.
U.S. Appl. No. 18/013,520, filed Dec. 28, 2022, Suzuki.
Notice of Allowance issued in related U.S. Appl. No. 18/013,515, dated Dec. 19, 2023, 10 pages.
Official Action issued in related U.S. Appl. No. 18/012,856, dated Feb. 2, 2024, 9 pages.
Official Action issued in related U.S. Appl. No. 18/012,857, dated Mar. 21, 2024, 13 pages.
Japanese Official Action issued in related application serial No. 2022-535275, dated Feb. 13, 2024, 8 pages.

\* cited by examiner

SLIDING COMPONENT

TECHNICAL FIELD

The present invention relates to a sliding component used in a rotating machine including an eccentric mechanism.

BACKGROUND ART

Machines entailing rotational driving and used in various industrial fields include not only a rotating machine rotating with its central axis held at a fixed position but also a rotating machine rotating with its central axis entailing eccentricity. The rotating machine rotating with eccentricity is, for example, a scroll compressor. This type of compressor is provided with, for example, a scroll compression mechanism including a fixed scroll having a spiral lap on the surface of an end plate and a movable scroll having a spiral lap on the surface of an end plate and an eccentric mechanism eccentrically rotating a rotary shaft. By the rotary shaft rotating, the movable scroll is slid relative to the fixed scroll with eccentric rotation. As a result, in this mechanism, the fluid supplied from the low-pressure chamber on the outer diameter side of the two scrolls is pressurized and a high-pressure fluid is discharged from the discharge hole formed in the middle of the fixed scroll.

These scroll compressors using the mechanism in which the movable scroll is slid relative to the fixed scroll with eccentric rotation are widely used in, for example, refrigeration cycles because the compressors are highly efficient in terms of compression and cause little noise. However, the compressors are problematic in that a refrigerant leaks from the axial gap between the two scrolls. The scroll compressor described in Patent Citation 1 includes a thrust plate sliding relative to a movable scroll on the back surface side of the movable scroll. A part of a refrigerant compressed by a scroll compression mechanism is supplied to the back pressure chamber formed on the back surface side of the thrust plate, and the movable scroll is pressed toward a fixed scroll. As a result, it is possible to reduce the leakage of the refrigerant from the axial gap between the two scrolls when the refrigerant is compressed.

CITATION LIST

Patent Literature

Patent Citation 1: JP 2016-61208 A (Pages 5 to 6, FIG. 1)

SUMMARY OF INVENTION

Technical Problem

In the scroll compressor described in Patent Citation 1, a part of the refrigerant compressed by the scroll compression mechanism is used to press the movable scroll from the back surface side toward the fixed scroll via the thrust plate. Accordingly, although the refrigerant leakage from the inter-scroll axial gap can be reduced, a pressing force acts from both axial sides between the two scrolls, especially on the sliding surface that entails the eccentric rotation between the movable scroll and the thrust plate. As a result, there is a problem that an increase in frictional resistance occurs, a smooth operation of the movable scroll is hindered, and the efficiency of compression cannot be enhanced.

The present invention has been made in view of such a problem, and an object of the present invention is to provide a sliding component capable of stably reducing the frictional resistance between sliding surfaces entailing eccentric rotation.

Solution to Problem

In order to solve the above problem, a sliding component according to the present invention is a sliding component formed in an annular shape and having a sliding surface relatively sliding with eccentric rotation, wherein the sliding surface is provided with a dynamic pressure generation groove having an annular shape along a circumferential direction of the sliding surface and a plurality of conduction grooves configured to provide communications between the dynamic pressure generation groove and one of two external spaces of the sliding surface, the external spaces being on an outer diameter side and an inner diameter side of the sliding surface, respectively, and an imaginary line passing through one of the conduction grooves and a center point of the sliding surface does not intersect any one of remains of the conduction grooves. According to the aforesaid feature of the present invention, when one conduction groove is moved toward the external space as a result of relative sliding between the sliding surface and a mating sliding surface entailing eccentric rotation or when a mating sliding surface is moved on one conduction groove toward the side radially opposite to the external space, the fluid in the external space is introduced into the dynamic pressure generation groove through one conduction groove and dynamic pressure is generated at the part in the vicinity of one conduction groove in the dynamic pressure generation groove. In addition, one conduction groove is not disposed on the imaginary line passing through another conduction groove and the center point of the sliding surface, only the dynamic pressure generation groove is on the imaginary line, and thus dynamic pressure is also generated at the part in the dynamic pressure generation groove radially facing one conduction groove. In other words, dynamic pressure is generated at a part in the vicinity of one conduction groove and a part radially facing the part in the vicinity of one conduction groove, the sliding surfaces can be separated from each other with the relative inclination of the sliding surfaces small, and that state can be maintained regardless of the eccentric rotation angle of the sliding surface. As a result, the lubricity between the sliding surfaces is improved and the frictional resistance of the sliding surfaces can be stably reduced.

It may be preferable that the conduction grooves are odd in number and equally arranged in a circumferential direction. According to this preferable configuration, the conduction grooves can be equally arranged in the circumferential direction in a state where the radially facing conduction grooves are not disposed on the imaginary line passing through the center point of the sliding surface. Accordingly, regardless of the eccentric rotation angle of the sliding surface, the sliding surfaces can be separated from each other in a state where the relative inclination of the sliding surfaces is small.

It may be preferable that the conduction grooves are deeper than the dynamic pressure generation groove. According to this preferable configuration, a fluid is held in the conduction groove deeper than the dynamic pressure generation groove, and thus a fluid is reliably supplied from the conduction groove to the dynamic pressure generation groove.

It may be preferable that there is a pressure difference between the external space on the inner diameter side of the sliding surface and the external space on the outer diameter side of the sliding surface, and the conduction groove communicates with the external space on a high-pressure side. According to this preferable configuration, a high-pressure fluid is introduced from the conduction groove into the dynamic pressure generation groove, and thus it is easy to separate the sliding surfaces from each other.

It may be preferable that at least one side wall defining the dynamic pressure generation groove has a plurality of intersection surfaces intersecting with respect to the circumferential direction. According to this preferable configuration, in a specific section in the eccentric sliding of the sliding surface, the sliding surface of a mating sliding component moves in the direction of intersecting the intersection surface, and thus dynamic pressure can be generated by the intersection surface.

It may be preferable that the intersection surfaces are included in the side wall on the inner diameter side. According to this preferable configuration, an intersection surface is provided on the side wall on the inner diameter side of the dynamic pressure generation groove, which is a curved surface convex to the outer diameter side when viewed from the inside of the dynamic pressure generation groove. In other words, the fluid in the dynamic pressure generation groove is easily dispersed in the circumferential direction by the convex curved surface, and an intersection surface is provided on the side wall on the inner diameter side, which is a structure on which dynamic pressure is less likely to be generated than on the side wall on the outer diameter side. Accordingly, the total dynamic pressure generated on the inner diameter side of the dynamic pressure generation groove is increased and it is easy to balance the pressure generated on the inner diameter side of the dynamic pressure generation groove and the pressure generated on the outer diameter side of the dynamic pressure generation groove.

BRIEF DESCRIPTION OF DRAWINGS

FIG. 4 is a diagram illustrating relative sliding between the sliding surface of the side seal and a sliding surface of a thrust plate in the first embodiment of the present invention. It should be noted that FIG. 4A illustrates the start position of the relative sliding

DESCRIPTION OF EMBODIMENTS

Modes for implementing the sliding component according to the present invention will be described below based on embodiments.

First Embodiment

The sliding component according to a first embodiment of the present invention will be described with reference to FIGS. 1 to 5. It should be noted that in the drawings, the groove formed in the sliding surface of the sliding component or the like is dotted for convenience of description.

The sliding component of the present invention is applied to a rotating machine including an eccentric mechanism such as a scroll compressor C that suctions, compresses, and discharges a refrigerant as a fluid used in the air conditioning system of an automobile or the like. It should be noted that the refrigerant in the present embodiment is a gas mixed with a mist-like lubricating oil.

Figure 1:
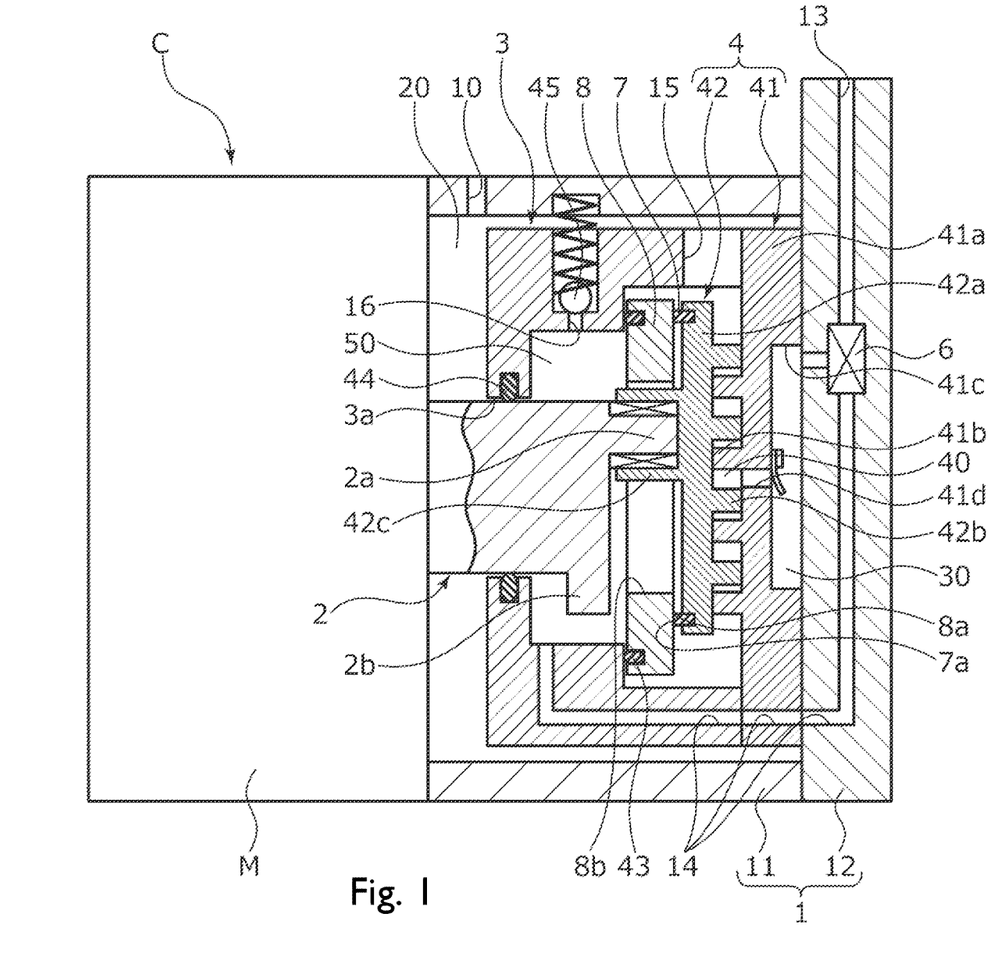
FIG. 1 is a schematic configuration diagram illustrating a scroll compressor to which a side seal as a sliding component according to a first embodiment of the present invention is applied.

First, the scroll compressor C will be described. As illustrated in FIG. 1, the scroll compressor C mainly includes a housing 1, a rotary shaft 2, an inner casing 3, a scroll compression mechanism 4, a side seal 7 as a sliding component, a thrust plate 8, and a drive motor M.

The housing 1 includes a cylindrical casing 11 and a cover 12 blocking an opening of the casing 11. The opening on one side of the casing 11 is blocked by the cover 12. The opening on the other side of the casing 11 is blocked by the drive motor M.

Formed in the casing 11 are a low-pressure chamber 20, a high-pressure chamber 30, and a back pressure chamber 50. A low-pressure refrigerant is supplied from a refrigerant circuit (not illustrated) to the low-pressure chamber 20 as the external space on the low-pressure side through a suction port 10. A high-pressure refrigerant compressed by the scroll compression mechanism 4 is discharged to the high-pressure chamber 30. A part of the refrigerant compressed by the scroll compression mechanism 4 is supplied, together with lubricating oil, to the back pressure chamber 50 as the external space on the high-pressure side. It should be noted that the back pressure chamber 50 is formed in the cylindrical inner casing 3 accommodated in the casing 11.

A discharge communication passage 13 is formed in the cover 12. The discharge communication passage 13 allows the refrigerant circuit (not illustrated) and the high-pressure chamber 30 to communicate with each other. In addition, a part of a back pressure communication passage 14 for communication between the high-pressure chamber 30 and the back pressure chamber 50 is formed in the cover 12 by branching off from the discharge communication passage 13. It should be noted that the discharge communication passage 13 is provided with an oil separator 6 for lubricating oil separation from a refrigerant.

The inner casing 3 is fixed with an axial end portion of the inner casing 3 abutting against an end plate 41a of a fixed scroll 41 constituting the scroll compression mechanism 4. In addition, the inner casing 3 has a side wall where a suction communication passage 15 penetrating the wall in the radial direction is formed. In other words, the low-pressure chamber 20 is formed from the outside of the inner casing 3 to the inside of the inner casing 3 via the suction communication passage 15. The refrigerant supplied to the inside of the inner casing 3 through the suction communication passage 15 is suctioned into the scroll compression mechanism 4.

The scroll compression mechanism 4 mainly includes the fixed scroll 41 and a movable scroll 42. The fixed scroll 41 is fixed to the cover 12 in a sealed shape. The movable scroll 42 is accommodated in the inner casing 3.

The fixed scroll 41 is made of metal and includes a spiral lap 41b. The spiral lap 41b projects toward the movable scroll 42 from the surface of the disk-shaped end plate 41a, that is, the end plate 41a. In addition, the fixed scroll 41 has a recessed portion 41c where the inner diameter side of the back surface of the end plate 41a, that is, the end surface of the end plate 41a that abuts against the cover 12 is recessed in the direction opposite to the cover 12. The high-pressure chamber 30 is defined from the recessed portion 41c and the cover 12.

The movable scroll 42 is made of metal and includes a spiral lap 42b. The spiral lap 42b projects toward the fixed scroll 41 from the surface of a disk-shaped end plate 42a, that is, the end plate 42a. In addition, a boss 42c protruding from the middle of the back surface of the end plate 42a is formed on the movable scroll 42. An eccentric portion 2a formed on the rotary shaft 2 is fitted into the boss 42c so as to be relatively rotatable. It should be noted that an eccentric mechanism causing the rotary shaft 2 to perform eccentric rotation is configured by the eccentric portion 2a of the rotary shaft 2 and a counterweight portion 2b protruding in the outer diameter direction from the rotary shaft 2 in the present embodiment.

When the rotary shaft 2 is rotationally driven by the drive motor M, the eccentric portion 2a rotates eccentrically and the movable scroll 42 slides, in a posture-maintained state, relative to the fixed scroll 41 with the eccentric rotation. At this time, the movable scroll 42 rotates eccentrically with respect to the fixed scroll 41 and, with this rotation, the contact positions of the laps 41b and 42b sequentially move in the rotation direction and a compression chamber 40 formed between the laps 41b and 42b gradually shrinks while moving toward the middle. As a result, the refrigerant suctioned into the compression chamber 40 from the low-pressure chamber 20 formed on the outer diameter side of the scroll compression mechanism 4 is compressed and, finally, the high-pressure refrigerant is discharged to the high-pressure chamber 30 through a discharge hole 41d provided in the middle of the fixed scroll 41.

Figure 2:
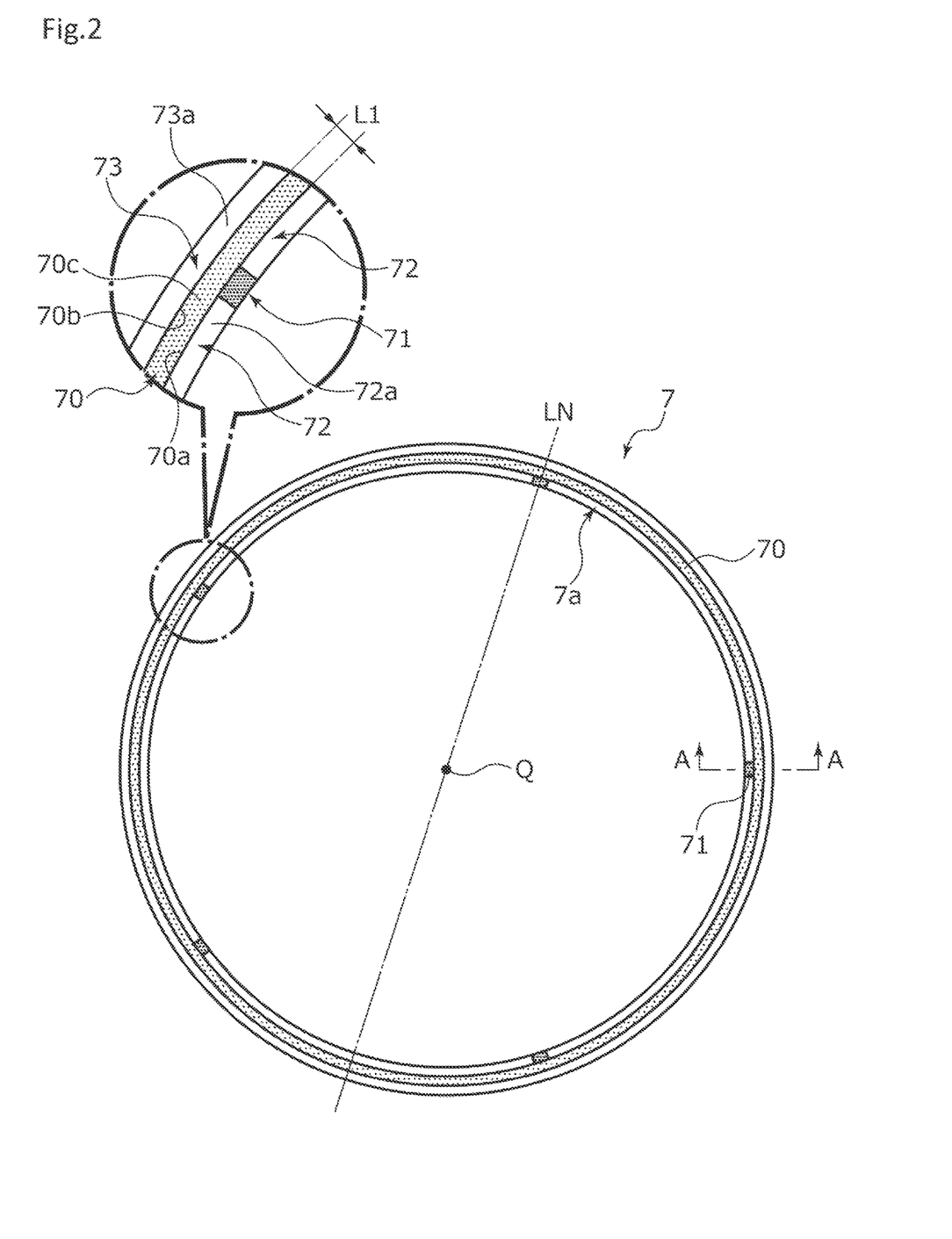
FIG. 2 is a diagram illustrating a sliding surface of the side seal in the first embodiment of the present invention.
Figure 3:
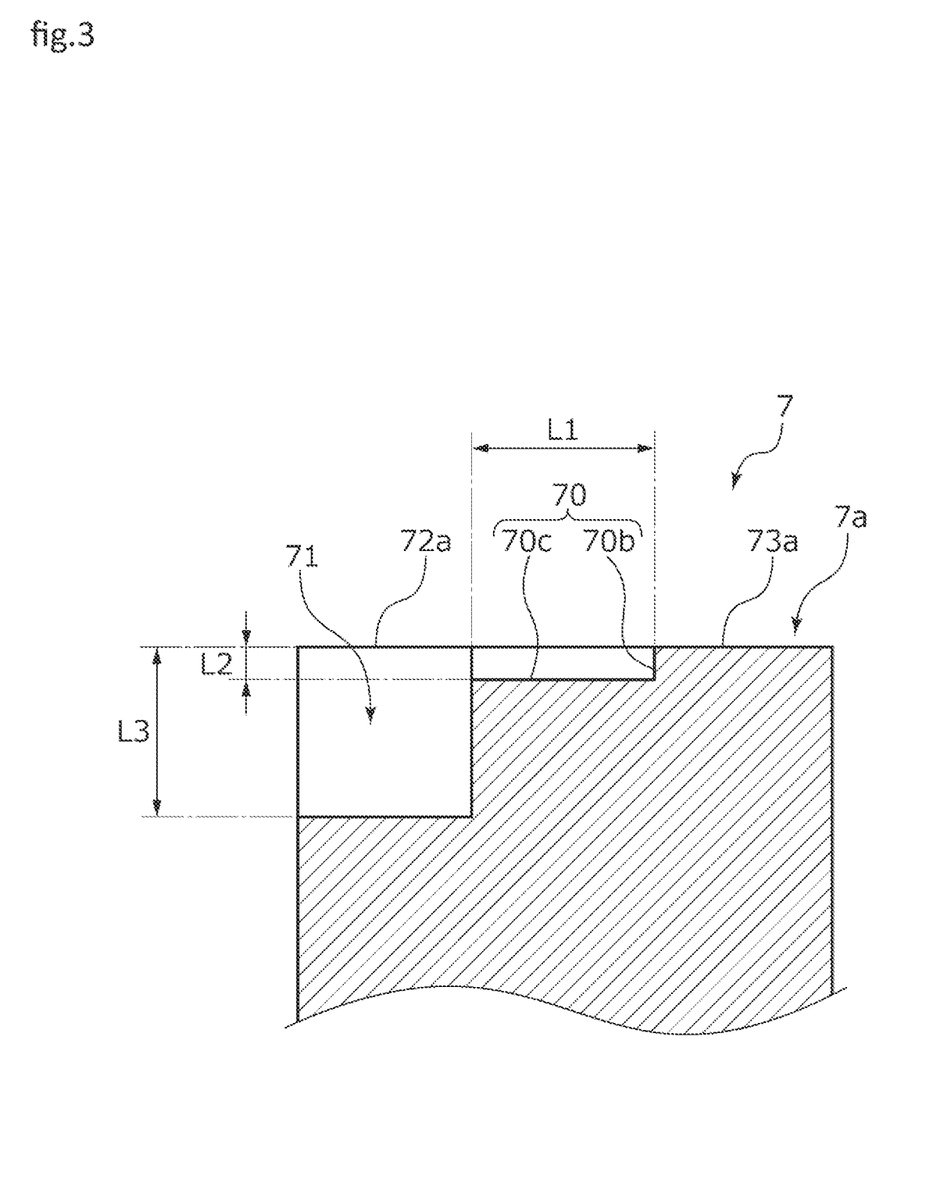
FIG. 3 is an A-A cross-sectional view.

Next, the side seal 7 as a sliding component in the present embodiment will be described. As illustrated in FIGS. 2 and 3, the side seal 7 is made of resin and has a rectangular cross section and an annular shape in an axial view. In addition, the side seal 7 is fixed to the back surface of the end plate 42a of the movable scroll 42 (see FIG. 1). It should be noted that a sliding surface 7a of the side seal 7 is illustrated in FIG. 2.

The side seal 7 has the sliding surface 7a abutting against a sliding surface 8a (see FIG. 1) of the thrust plate 8.

As illustrated in FIG. 2, the sliding surface 7a of the side seal 7 includes a dynamic pressure generation groove 70, a plurality of conduction grooves 71, a land 72, and a land 73. The dynamic pressure generation groove 70 is formed in a circular shape centered on a center point Q of the annular sliding surface 7a. The plurality of conduction grooves 71 are provided on the inner diameter side of the dynamic pressure generation groove 70. The land 72 is provided on the inner diameter side beyond the dynamic pressure generation groove 70. The land 73 is provided on the outer diameter side beyond the dynamic pressure generation groove 70.

As illustrated in FIGS. 2 and 3, the dynamic pressure generation groove 70 is defined by an inner side wall 70a, an outer side wall 70b, and a bottom surface 70c. The inner side wall 70a is formed as a side wall on the inner diameter side extending in the depth direction orthogonal to a flat surface 72a of the land 72. The outer side wall 70b is formed as a side wall on the outer diameter side extending in the depth direction orthogonal to a flat surface 73a of the land 73. The bottom surface 70c extends parallel to the surfaces 72a and 73a formed on the same surface and is formed by connecting the end portions of the inner side wall 70a and the outer side wall 70b.

A radial width dimension L1 of the dynamic pressure generation groove 70 (that is, the separation width between the inner side wall 70a and the outer side wall 70b) is formed larger than a depth dimension L2 of the dynamic pressure generation groove 70 (i.e., L1>L2). It should be noted that the width dimension L1 is preferably 10 times or more the depth dimension L2 although the width dimension and the depth dimension of the dynamic pressure generation groove 70 can be freely changed on condition that the width dimension of the dynamic pressure generation groove 70 is formed larger than the depth dimension of the dynamic pressure generation groove 70.

The conduction groove 71 extends from the inner side wall 70a of the dynamic pressure generation groove 70 to the inner peripheral surface of the side seal 7 and is open to the inner diameter side. In other words, the dynamic pressure generation groove 70 communicates through the conduction groove 71 with the back pressure chamber 50 (see FIG. 1) as the external space on the inner diameter side of the sliding surface 7a.

In addition, the conduction grooves 71 are odd in number (e.g., 5 in the present embodiment) and are equally arranged in the circumferential direction of the sliding surface 7a. Specifically, as for the disposition relationship of the conduction grooves 71, another conduction groove 71 does not intersect an imaginary line LN passing through one conduction groove 71 and the center point Q. In other words, no conduction groove 71 is provided at the position symmetrical to each conduction groove 71 with respect to the center point Q.

As illustrated in FIG. 3, a depth dimension L3 of the conduction groove 71 is formed deeper than the depth dimension L2 of the dynamic pressure generation groove 70 (i.e., L2<L3). It should be noted that it is preferable that the depth dimension of the conduction groove 71 is formed deeper than the depth dimension of the dynamic pressure generation groove 70 and it is particularly preferable that the depth dimension L3 is 10 times or more the depth dimension L2 although the depth dimensions of the dynamic pressure generation groove 70 and the conduction groove 71 can be freely changed.

Referring to FIG. 1, the thrust plate 8 is made of metal and has an annular shape. In addition, a seal ring 43 is fixed to the thrust plate 8. In addition, the seal ring 43 abuts against the inside surface of the inner casing 3. As a result, the thrust plate 8 functions as a thrust bearing that receives an axial load of the movable scroll 42 via the side seal 7.

In addition, the side seal 7 and the seal ring 43 partition the low-pressure chamber 20 formed on the outer diameter side of the movable scroll 42 and the back pressure chamber 50 formed on the back surface side of the movable scroll 42 in the inner casing 3. The back pressure chamber 50 is a closed section formed between the inner casing 3 and the rotary shaft 2. A seal ring 44 is fixed to the inner periphery of a through hole 3a provided in the middle of the other end of the inner casing 3 and is in sliding contact in a sealed shape with the rotary shaft 2 inserted through the through hole 3a. In addition, the back pressure communication passage 14 allowing the high-pressure chamber 30 and the back pressure chamber 50 to communicate with each other is formed over the cover 12, the fixed scroll 41, and the inner casing 3. In addition, the back pressure communication passage 14 is provided with an orifice (not illustrated) and, after depressurization adjustment by means of the orifice, the refrigerant in the high-pressure chamber 30 is supplied to the back pressure chamber 50 together with the lubricating oil separated by the oil separator 6. At this time, the pressure in the back pressure chamber 50 is adjusted to be higher than the pressure in the low-pressure chamber 20. It should be noted that a pressure release hole 16 is formed in the inner casing 3, penetrates the inner casing 3 in the radial direction, and allows the low-pressure chamber 20 and the back pressure chamber 50 to communicate with each other. In addition, a pressure adjustment valve 45 is provided in the pressure release hole 16. The pressure adjustment valve 45 is opened by the pressure of the back pressure chamber 50 exceeding a set value.

In addition, the boss 42c of the movable scroll 42 is inserted through a through hole 8b in the middle of the thrust plate 8. The through hole 8b is formed to have a diameter size at which it is possible to allow eccentric rotation by the eccentric portion 2a of the rotary shaft 2 fitted into the boss 42c. In other words, the sliding surface 7a of the side seal 7 is capable of sliding relative to the sliding surface 8a of the thrust plate 8 with eccentric rotation by the eccentric rotation of the rotary shaft 2 (see FIG. 4).

Figure 4A:
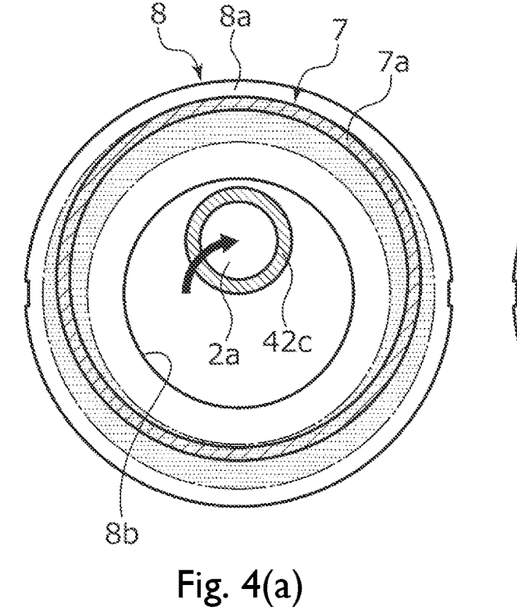
Figure 4B:
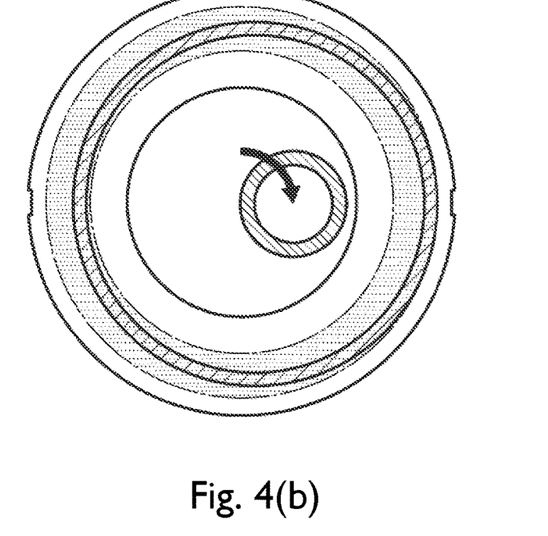
FIGS. 4B to 4D illustrate the positional relationships between the relatively sliding surfaces of the side seal and the thrust plate at an eccentric rotary shaft rotation of 90, 180, and 270 degrees, respectively.
Figure 4C:
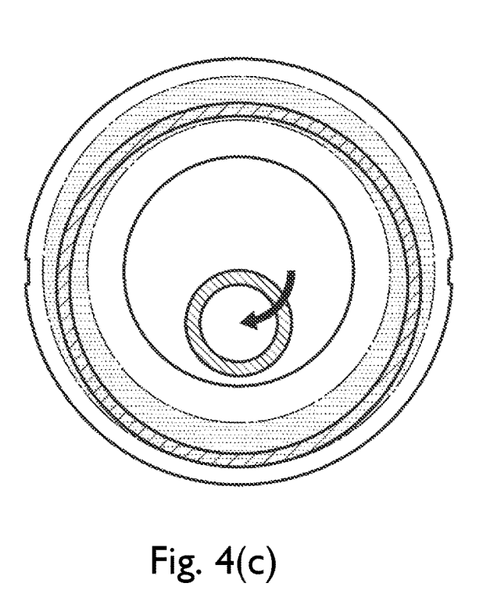
Figure 4D:
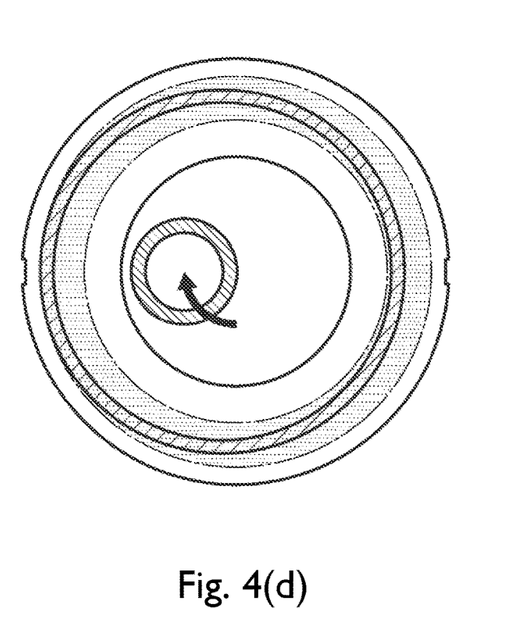

It should be noted that FIGS. 4A to 4D in FIG. 4 illustrate the rotational trajectory of the boss 42c that is viewed from the fixed scroll 41 side and indicated by the black arrows. Respectively illustrated in FIGS. 4B to 4D are the boss 42c rotated by 90 degrees, 180 degrees, and 270 degrees with FIG. 4A serving as the clockwise reference. In addition, the sliding region between the sliding surface 7a of the side seal 7 and the sliding surface 8a of the thrust plate 8 is schematically illustrated by dots. In addition, regarding the rotary shaft 2, the counterweight portion 2b constituting the eccentric mechanism and so on are not illustrated and only the eccentric portion 2a fitted into the boss 42c is illustrated for convenience of description.

As described above, the side seal 7 is a sliding component having the sliding surface 7a sliding relative to the sliding surface 8a of the thrust plate 8 with the eccentric rotation.

Figure 5:
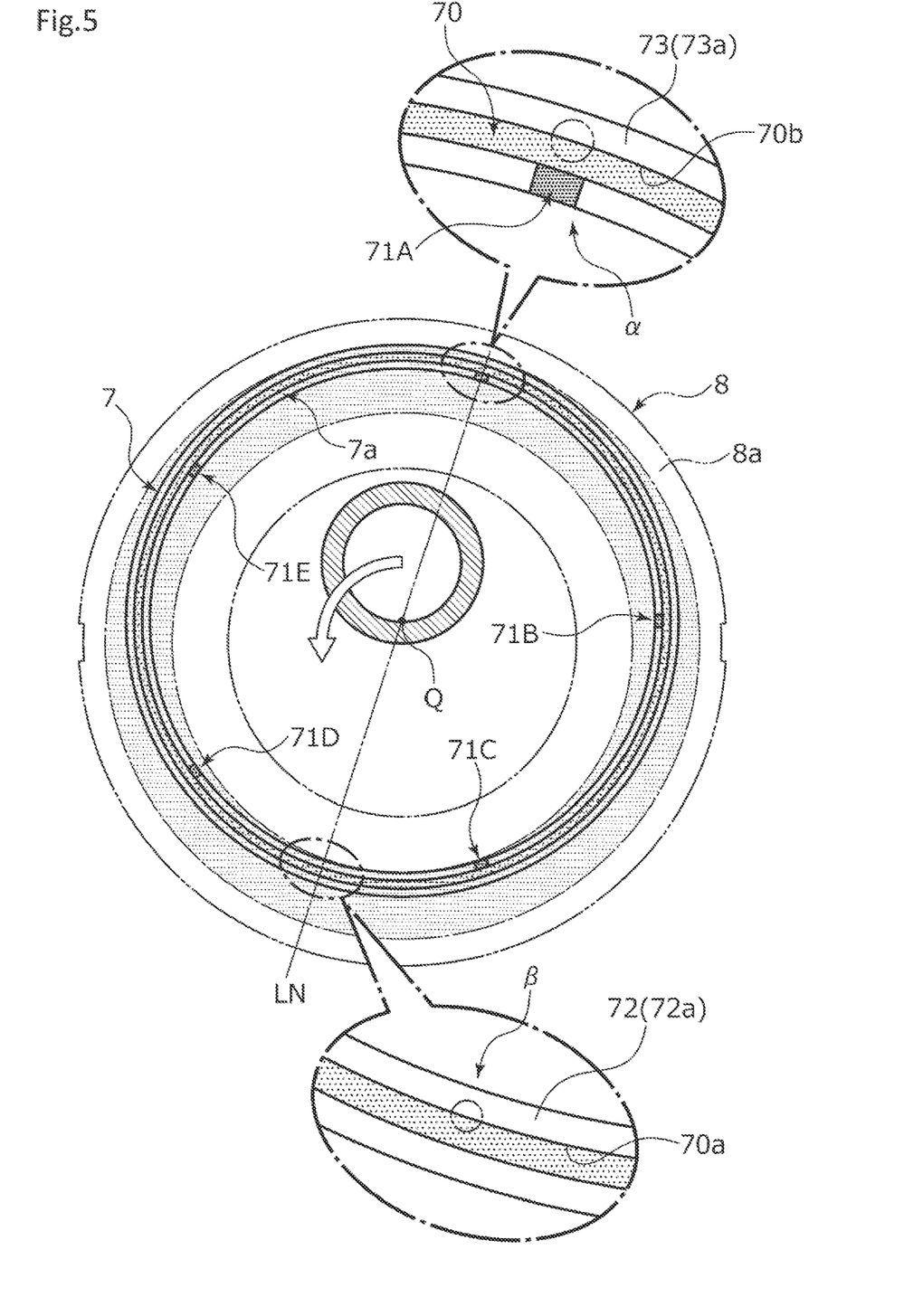
FIG. 5 is a diagram illustrating where the dynamic pressure generated in a dynamic pressure generation groove is generated on the sliding surface of the side seal eccentrically rotating from the state of FIG. 4A toward the state of FIG. 4B.

Next, dynamic pressure generation during the sliding of the side seal 7 relative to the thrust plate 8 will be described with reference to FIG. 5. It should be noted that FIG. 5 illustrates an aspect when the side seal 7 moves from the state of FIG. 4A toward the state of FIG. 4B. In addition, in FIG. 5, the side seal 7 in a case where the sliding surface 7a is viewed from the axial direction is illustrated, and the circle marks illustrated in the enlarged portions indicate the points where the pressure increases in the dynamic pressure generation groove 70. In addition, a fluid containing, for example, a refrigerant and lubricating oil is stored in the dynamic pressure generation groove 70 and the conduction groove 71 even when the rotation is stopped.

In addition, in FIG. 5, the conduction groove disposed diagonally upward to the right is referred to as a conduction groove 71A, and conduction grooves 71B, 71C, 71D, and 71E are in the clockwise direction with respect to the conduction groove 71A.

As illustrated in FIG. 5, when the side seal 7 is to move in the direction of the white arrow, the fluid in the dynamic pressure generation groove 70 and each conduction groove 71 moves in the opposite direction relative to the white arrow.

As a result, dynamic pressure is generated on the outer side wall 70b in the vicinity of the conduction groove 71A, the sliding surfaces 7a and 8a are slightly separated from each other, and a fluid film is formed by the fluid.

Because of the relative eccentric rotation angle relationship between the outer side wall 70b and the sliding surface 8a, this dynamic pressure becomes highest at the part in the outer side wall 70b in the vicinity of the conduction groove 71A and gradually decreases toward the circumferential direction of the dynamic pressure generation groove 70. The dynamic pressure is slightly generated on the outer side wall 70b in the vicinity of the conduction grooves 71B and 71E as well and is hardly generated at the positions of 90-degree and 270-degree clockwise rotation from the vicinity of the conduction groove 71A.

In addition, a high-pressure fluid is introduced from the back pressure chamber 50 (see FIG. 1) into the dynamic pressure generation groove 70 through the conduction groove 71A having an inner diameter side open toward the direction of the white arrow, that is, the conduction groove 71A moving toward the back pressure chamber 50, and thus a large dynamic pressure can be generated using a high-pressure fluid on the outer side wall 70b in the vicinity of the conduction groove 71A.

It should be noted that in the conduction grooves 71B and 71E, a high-pressure fluid is slightly introduced from the back pressure chamber 50.

In addition, the other conduction grooves 71B to 71E are not disposed on the imaginary line LN passing through the conduction groove 71A and the center point Q and, in a region β of the sliding surface 7a at the position symmetrical to a region α of the sliding surface 7a, where the conduction groove 71A is formed, with respect to the center point Q, only the dynamic pressure generation groove 70 exists except for the land 72 on the inner diameter side and the land 73 on the outer diameter side.

Accordingly, in the region β of the sliding surface 7a, dynamic pressure is generated on the inner side wall 70a on the inner diameter side, the sliding surfaces 7a and 8a are slightly separated from each other, and a fluid film is formed by the fluid.

Because of the relative eccentric rotation angle relationship between the inner side wall 70a and the sliding surface 8a, this dynamic pressure is highest at the part in the inner side wall 70a in the vicinity of the region β of the sliding surface 7a. In addition, this dynamic pressure gradually decreases toward the circumferential direction of the dynamic pressure generation groove 70 and little dynamic pressure is generated at the positions of 90-degree and 270-degree clockwise rotation from the vicinity of the region β of the sliding surface 7a.

It should be noted that in the vicinity of the conduction grooves 71C and 71D, the fluid in the dynamic pressure generation groove 70 flows out to the back pressure chamber 50 (see FIG. 1) through the conduction grooves 71C and 71D, and thus the dynamic pressure is hardly generated on the inner side wall 70a in the vicinity of the conduction grooves 71C and 71D.

In addition, the outer side wall 70b on the outer diameter side positioned in the vicinity of the conduction groove 71A is a curved surface concave with respect to the direction in which the fluid in the dynamic pressure generation groove 70 flows in an axial view. Accordingly, in this structure, the fluid in the dynamic pressure generation groove 70 can be held and dynamic pressure is easily generated when the side seal 7 is moved in the direction of the white arrow.

In addition, the inner side wall 70a of the region β is a curved surface convex with respect to the direction in which the fluid in the dynamic pressure generation groove 70 flows in an axial view. Accordingly, in this structure, the fluid in the dynamic pressure generation groove 70 is dispersed in the circumferential direction and dynamic pressure generation is less likely than in the case of the outer side wall 70b when the side seal 7 is moved in the direction of the white arrow.

Accordingly, the dynamic pressure generated on the outer side wall 70b is larger than the dynamic pressure generated on the inner side wall 70a.

In this manner, when the side seal 7 is slid relative to the thrust plate 8 with eccentric rotation, dynamic pressure is generated on the outer side wall 70b in the dynamic pressure generation groove 70 and the inner side wall 70a in the dynamic pressure generation groove 70 and the sliding surfaces 7a and 8a can be separated from each other with the relative inclination of the sliding surfaces 7a and 8a suppressed.

In addition, in the sliding of the side seal 7 relative to the thrust plate 8 and entailing eccentric rotation, the position where the dynamic pressure is generated continuously moves along the circumferential direction of the dynamic pressure generation groove 70 in accordance with the movement direction of the sliding surface 7a of the side seal 7. The dynamic pressure generation groove 70 has an annular shape, and thus the sliding surface 7a can be eccentrically rotated and slid, while maintaining a state where the sliding surfaces 7a and 8a are separated from each other and the relative inclination of the sliding surfaces 7a and 8a is suppressed, regardless of the eccentric rotation angle of the sliding surface 7a. Accordingly, the lubricity between the sliding surfaces 7a and 8a can be improved and the frictional resistance of the sliding surfaces 7a and 8a can be stably reduced.

In addition, the conduction grooves 71 are odd in number (5 in the present embodiment) and are equally arranged in the circumferential direction of the sliding surface 7a. According to this, the conduction grooves 71 are equally arranged in the circumferential direction in a state where the conduction grooves 71 facing each other in the radial direction are not disposed on the imaginary line LN passing through the center point Q. Accordingly, regardless of the eccentric rotation angle of the sliding surface 7a, the sliding surface 7a can be separated from the sliding surface 8a in a state where the relative inclination of the sliding surfaces 7a and 8a is small.

In addition, since the depth dimension L3 of the conduction groove 71 is formed deeper than the depth dimension L2 of the dynamic pressure generation groove 70 (i.e., L2<L3), a large amount of fluid can be held in the conduction groove 71 deeper than the dynamic pressure generation groove 70, and thus a fluid can be reliably supplied to the dynamic pressure generation groove 70.

In addition, the conduction groove 71 communicates with the back pressure chamber 50 on the high-pressure side and uses a high-pressure fluid, and thus it is easy to separate the sliding surfaces 7a and 8a from each other.

Specifically, dynamic pressure is generated in the dynamic pressure generation groove 70 using a high-pressure fluid, and thus the pressure of the dynamic pressure generated in the dynamic pressure generation groove 70 increases and the sliding surfaces 7a and 8a can be reliably separated from each other.

In addition, the back pressure chamber 50 extends to the inner diameter side of the sliding surfaces 7a and 8a. Accordingly, when the sliding surfaces 7a and 8a are separated from each other, the fluid in the back pressure chamber 50 is introduced from the inner diameter side of the sliding surfaces 7a and 8a. In addition, when the scroll compression mechanism 4 is driven, the pressure of the back pressure chamber 50 increases, a high-pressure fluid is introduced between the sliding surfaces 7a and 8a from the back pressure chamber 50, and thus the sliding surfaces 7a and 8a can be further separated from each other by the pressure of the fluid.

It should be noted that the dynamic pressure generation groove 70 may be slightly elliptical although the dynamic pressure generation groove 70 in the present embodiment is annular when viewed from the axial direction.

In addition, although the present embodiment exemplifies a form in which the conduction grooves 71 are odd in number and equally arranged in the circumferential direction, the present invention is not limited thereto. The conduction grooves may be even in number and unequally arranged insofar as the conduction grooves facing each other in the radial direction are disposed in a state of not being disposed on the imaginary line passing through the center point of the sliding surface. In addition, the conduction grooves may be odd in number and unequally arranged.

Second Embodiment

Next, a dynamic pressure generation groove 170 of a side seal 107 as a sliding component according to a second embodiment of the present invention will be described with reference to FIG. 6. It should be noted that the description of configurations identical to those of the first embodiment will be omitted for redundancy avoidance.

Figure 6:
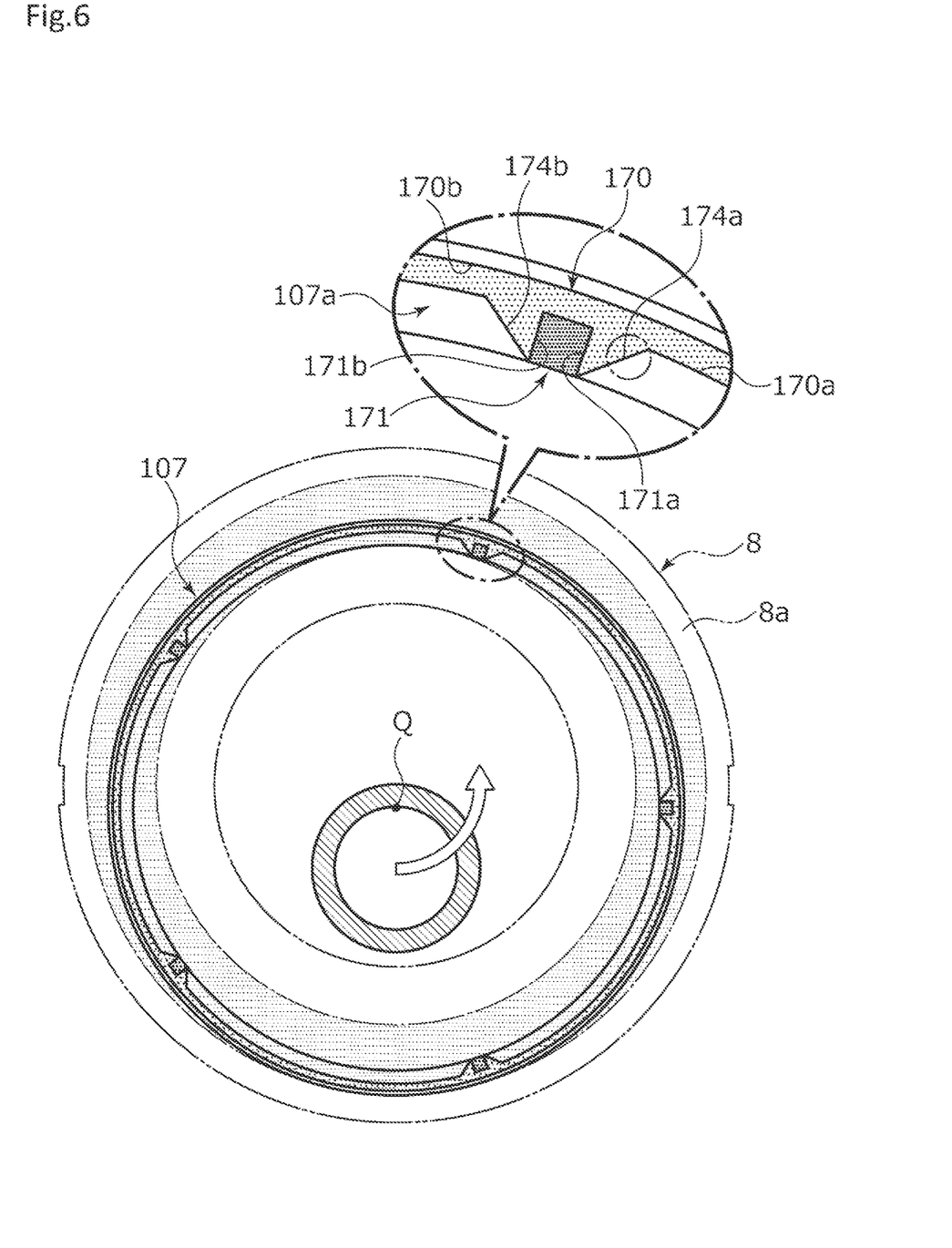
FIG. 6 is a diagram illustrating a dynamic pressure generation groove of a sliding component according to a second embodiment of the present invention.

As illustrated in FIG. 6, an inner side wall 170a of the dynamic pressure generation groove 170 is provided with intersection surfaces 174a and 174b intersecting the circumferential direction of a sliding surface 107a in the vicinity of each conduction groove 171.

Specifically, the intersection surface 174a linearly extends from the inner diameter end of an inner side wall 171a of the conduction groove 171 toward the outer diameter side in the clockwise direction. In addition, the intersection surface 174b linearly extends from the inner diameter end of an inner side wall 171b of the conduction groove 171 toward the outer diameter side in the counterclockwise direction. In other words, the dynamic pressure generation groove 170 is enlarged in the vicinity of each conduction groove 171.

Dynamic pressure generation when the sliding surface 107a is eccentrically rotated and slid with respect to the sliding surface 8a will be described. It should be noted that exemplified and described here is dynamic pressure generation in the vicinity of the conduction groove 171 disposed diagonally upward to the right in moving from the state of FIG. 4C to the state of FIG. 4B.

As illustrated in FIG. 6, when the sliding surface 107a is moved toward the white arrow, the movement direction of the sliding surface 107a intersects the intersection surface 174a in a specific section, and thus the fluid in the dynamic pressure generation groove 170 is capable of generating dynamic pressure on the intersection surface 174a.

In addition, the intersection surfaces 174a and 174b are provided on the inner side wall 170a, dynamic pressure is less likely to be generated on the inner side wall 170a than on an outer side wall 170b of the dynamic pressure generation groove 170, and thus the total dynamic pressure on the inner diameter side of the dynamic pressure generation groove 170 is increased and it is easy to balance the pressure generated on the inner diameter side of the dynamic pressure generation groove 170 and the pressure generated on the outer diameter side of the dynamic pressure generation groove 170. In other words, the relative inclination of the sliding surface 107a and the sliding surface 8a can be suppressed.

Third Embodiment

Next, a dynamic pressure generation groove 270 of a side seal 207 as a sliding component according to a third embodiment of the present invention will be described with reference to FIG. 7. It should be noted that the description of configurations identical to those of the first embodiment will be omitted for redundancy avoidance.

Figure 7:
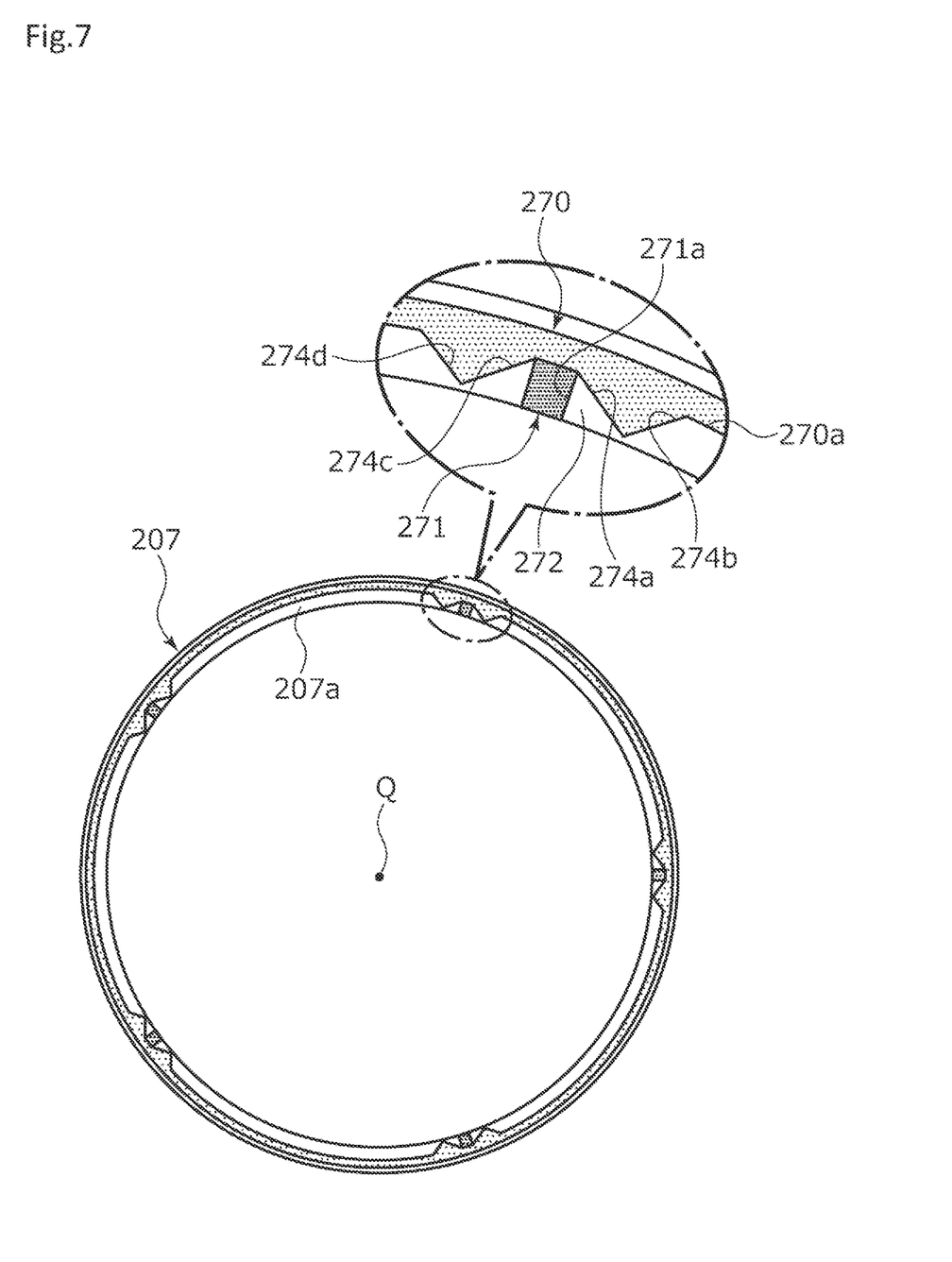
FIG. 7 is a diagram illustrating a dynamic pressure generation groove of a sliding component according to a third embodiment of the present invention.

As illustrated in FIG. 7, an inner side wall 270a of the dynamic pressure generation groove 270 is provided with intersection surfaces 274a, 274b, 274c, and 274d intersecting the circumferential direction of a sliding surface 207a in the vicinity of each conduction groove 271.

Specifically, the intersection surface 274a linearly extends from the outer diameter end of an inner side wall 271a of the conduction groove 271 to the inner diameter side in the clockwise direction and reaches the inner diameter of the sliding surface 207a. In other words, a land 272 is formed between the intersection surface 274a and the conduction groove 271.

In addition, the intersection surface 274b linearly extends from the inner diameter end of the intersection surface 274a to the outer diameter side in the clockwise direction and reaches the inner side wall 270a. In addition, the intersection surfaces 274c and 274d are line-symmetrical in shape to the intersection surfaces 274a and 274b with respect to an imaginary line (not illustrated) extending to the center point Q through the middle of the conduction groove 271 in the circumferential direction.

In this manner, by providing the intersection surfaces 274a, 274b, 274c, and 274d in the vicinity of each conduction groove 271, the total dynamic pressure on the inner diameter side of the dynamic pressure generation groove 270 is increased.

It should be noted that the intersection surface is not limited to being provided in the vicinity of the conduction groove and may be provided at a position separated from the conduction groove in the circumferential direction.

In addition, the conduction groove is not limited to being provided on the side wall on the inner diameter side of the dynamic pressure generation groove and may be provided on the side wall on the outer diameter side.

Although embodiments of the present invention have been described above with reference to the drawings, the specific configurations are not limited to the embodiments and any changes or additions within the scope of the present invention are included in the present invention.

Although an aspect in which the side seal 7 as a sliding component is applied to the scroll compressor C used in the air conditioning system of an automobile or the like has been described in the first to third embodiments, the present invention is not limited thereto and the side seal 7 as a sliding component may be applied to, for example, a scroll expansion compressor provided integrally with an expander and a compressor insofar as it is a rotating machine including an eccentric mechanism.

In addition, each of the fluids in the spaces inside and outside the sliding surface of the sliding component may be any of a gas, a liquid, and a gas-liquid mixture.

In addition, insofar as the sliding component of the present invention has a sliding surface that relatively slides with eccentric rotation, the sliding component of the present invention may be used in an environment in which the pressure inside the sliding surface and the pressure outside the sliding surface are equal to each other without being limited to an environment in which there is a pressure difference between the inside and outside of the sliding surface. In addition, the sliding component of the present invention does not have to function as a seal and may be one capable of stably reducing the frictional resistance of a sliding surface.

In addition, although the side seal having the relatively sliding surface is made of resin and the thrust plate is made of metal in the first to third embodiments, the material of the sliding component may be freely selected in accordance with the environment of use and so on.

In addition, although an aspect in which a dynamic pressure generation groove and a conduction groove are formed in the sliding surface of the side seal has been described in the first to third embodiments, the present invention is not limited thereto. A dynamic pressure generation groove may be formed in the sliding region of the sliding surface of the thrust plate (see FIG. 4), which is a sliding component having a sliding surface relatively sliding with eccentric rotation. In addition, dynamic pressure generation and conduction grooves may be formed in both the sliding surface of the side seal and the sliding surface of the thrust plate.

In addition, although a configuration in which the sliding surface of the side seal as a sliding component and the sliding surface of the thrust plate slide relative to each other with eccentric rotation has been described in the first to third embodiments, the present invention is not limited thereto. Dynamic pressure generation and conduction grooves may be formed in the sliding surface relatively sliding with eccentric rotation with only one of the side seal and the thrust plate provided. For example, in a case where only the thrust plate is provided, dynamic pressure generation and conduction grooves may be formed in one or both of the sliding surface of the thrust plate as a sliding component and the back surface of the end plate of the movable scroll. In addition, in a case where only the side seal is provided, a groove may be formed in the sliding surface of the side seal as a sliding component. In this case, the side seal also functions as a thrust bearing that abuts against the inner peripheral surface of the inner casing and receives the axial load of the movable scroll.

In addition, in a case where the side seal and the thrust plate are not provided and the back surface of the end plate of the movable scroll functions as a thrust bearing that abuts against the inner peripheral surface of the inner casing and receives the axial load of the movable scroll, dynamic pressure generation and conduction grooves may be formed in the sliding surface formed on the back surface of the end plate of the movable scroll.

In addition, the present invention is not limited to the exemplification that the depth dimension of the conduction groove is formed deeper than the depth dimension of the dynamic pressure generation groove. The conduction groove may have the same depth as the dynamic pressure generation groove.

In addition, although a form in which the conduction groove communicates with the back pressure chamber, which is the external space on the high-pressure side, has been exemplified, the conduction groove may communicate with the external space on the low-pressure side. In addition, a part of the conduction groove may communicate with the external space on the high-pressure side with another part of the conduction groove communicating with the external space on the low-pressure side.

In addition, although a form in which the external space on the low-pressure side is on the outer diameter side of the side seal and the high-pressure external space is on the inner diameter side of the side seal has been exemplified, the external space on the low-pressure side may be on the inner diameter side of the side seal with the high-pressure external space on the outer diameter side of the side seal.

REFERENCE SIGNS LIST

4 Scroll compression mechanism
7 Side seal (sliding component)
7a Sliding surface
8 Thrust plate
8a Sliding surface
20 Low-pressure chamber (external space on outer diameter side)
30 High-pressure chamber
40 Compression chamber
41 Fixed scroll
42 Movable scroll
50 Back pressure chamber (external space on inner diameter side, external space on high-pressure side)
70 Dynamic pressure generation groove
70a Inner side wall (side wall on inner diameter side)
70b Outer side wall (side wall on outer diameter side)
71, 71A Conduction groove
107 Side seal (sliding component)
107a Sliding surface
170 Dynamic pressure generation groove
170a Inner side wall (side wall on inner diameter side)
170b Outer side wall (side wall on outer diameter side)
171 Conduction groove
174a, 174b Intersection surface
207 Side seal (sliding component)
207a Sliding surface
270 Dynamic pressure generation groove
270a Inner side wall (side wall on inner diameter side)
271 Conduction groove
274a to 274d Intersection surface
C Scroll compressor
LN Imaginary line
M Drive motor
Q Center point

The invention claimed is:

1. An eccentric sliding assembly comprising:
a first sliding component formed in an annular shape and having a sliding surface
a second sliding component having a sliding surface; and
an eccentric driving device configured so that the sliding surface of the first sliding component with the sliding surface of the second sliding surface is such that a center of the first sliding component imaginarily draws a circle which is eccentric with respect to a center of the second sliding component while keeping non-rotation state of the first sliding component with respect to the center of the first sliding component in a plan view, wherein
the sliding surface of at least one of the first sliding component and the second sliding component is provided with a dynamic pressure generation groove having an annular shape along a circumferential direction and a plurality of conduction grooves configured to provide communications between the dynamic pressure generation groove and one of two external spaces of the sliding surface provided with the dynamic pressure generation groove the conduction grooves, the external spaces being on an outer diameter side and an inner diameter side of the sliding surface provided with the dynamic pressure generation groove the conduction grooves, respectively, and
an imaginary line passing through one of the conduction grooves and a center point of the sliding surface provided with the dynamic pressure generation groove the conduction grooves does not intersect any one of remains of the conduction grooves.

2. The eccentric sliding assembly according to claim 1, wherein the conduction grooves are odd in number and equally arranged in a circumferential direction.

3. The eccentric sliding assembly according to claim 1, wherein the conduction grooves are deeper than the dynamic pressure generation groove.

4. The eccentric sliding assembly according to claim 1, wherein there is a pressure difference between the external space on the inner diameter side of the sliding surface and the external space on the outer diameter side of the sliding surface provided with the dynamic pressure generation groove and the conduction grooves, and the conduction groove communicates with the external space on a high-pressure side.

5. The eccentric sliding assembly according to claim 1, wherein at least one side wall defining the dynamic pressure generation groove has a plurality of intersection surfaces intersecting with respect to the circumferential direction.

6. The eccentric sliding assembly according to claim 5, wherein the intersection surfaces are included in the side wall on the inner diameter side.

7. The eccentric sliding assembly according to claim 2, wherein the conduction grooves are deeper than the dynamic pressure generation groove.

8. The eccentric sliding assembly according to claim 2, wherein there is a pressure difference between the external space on the inner diameter side of the sliding surface and the external space on the outer diameter side of the sliding surface provided with the dynamic pressure generation groove and the conduction grooves, and the conduction groove communicates with the external space on a high-pressure side.

9. The eccentric sliding assembly according to claim 2, wherein at least one side wall defining the dynamic pressure generation groove has a plurality of intersection surfaces intersecting with respect to the circumferential direction.

10. The eccentric sliding assembly according to claim 9, wherein the intersection surfaces are included in the side wall on the inner diameter side.

11. The eccentric sliding assembly according to claim 3, wherein there is a pressure difference between the external space on the inner diameter side of the sliding surface and the external space on the outer diameter side of the sliding surface provided with the dynamic pressure generation groove and the conduction grooves, and the conduction groove communicates with the external space on a high-pressure side.

12. The eccentric sliding assembly according to claim 3, wherein at least one side wall defining the dynamic pressure generation groove has a plurality of intersection surfaces intersecting with respect to the circumferential direction.

13. The eccentric sliding assembly according to claim 12, wherein the intersection surfaces are included in the side wall on the inner diameter side.

14. The eccentric sliding assembly according to claim 4, wherein at least one side wall defining the dynamic pressure generation groove has a plurality of intersection surfaces intersecting with respect to the circumferential direction.

15. The eccentric sliding assembly according to claim 14, wherein the intersection surfaces are included in the side wall on the inner diameter side.

16. The eccentric sliding assembly according to claim 1, wherein the first sliding component is a movable sliding component and the second sliding component is a fixed sliding component.

17. The eccentric sliding assembly according to claim 1, wherein the first sliding component is a fixed sliding component and the second sliding component is a movable sliding component.

18. A sliding component formed in an annular shape and having a sliding surface relatively sliding with eccentric rotation, wherein
the sliding surface is provided with a dynamic pressure generation groove having an annular shape along a circumferential direction of the sliding surface and a plurality of conduction grooves configured to provide communications between the dynamic pressure generation groove and one of two external spaces of the sliding surface, the external spaces being on an outer diameter side and an inner diameter side of the sliding surface, respectively, and
an imaginary line passing through one of the conduction grooves and a center point of the sliding surface does not intersect any one of remains of the conduction grooves,
wherein at least one side wall defining the dynamic pressure generation groove has a plurality of intersection surfaces intersecting with respect to the circumferential direction, and
wherein the intersection surfaces are included in the side wall on the inner diameter side.

19. The sliding component according to claim 18, wherein the conduction grooves are odd in number and equally arranged in a circumferential direction.

20. The sliding component according to claim 18, wherein the conduction grooves are deeper than the dynamic pressure generation groove.

* * * * *